May 24, 1949.　　　　　R. HASKINS, JR　　　　　2,470,773
ASYMMETRIC SCORSBY AND METHOD OF OPERATION
Filed May 3, 1944　　　　　　　　　　　　　　3 Sheets-Sheet 1

INVENTOR
ROBERT HASKINS, JR.
BY
*Herbert H. Thompson*
his ATTORNEY.

May 24, 1949.　　　　R. HASKINS, JR　　　　2,470,773
ASYMMETRIC SCORSBY AND METHOD OF OPERATION
Filed May 3, 1944　　　　　　　　　　　　3 Sheets-Sheet 2
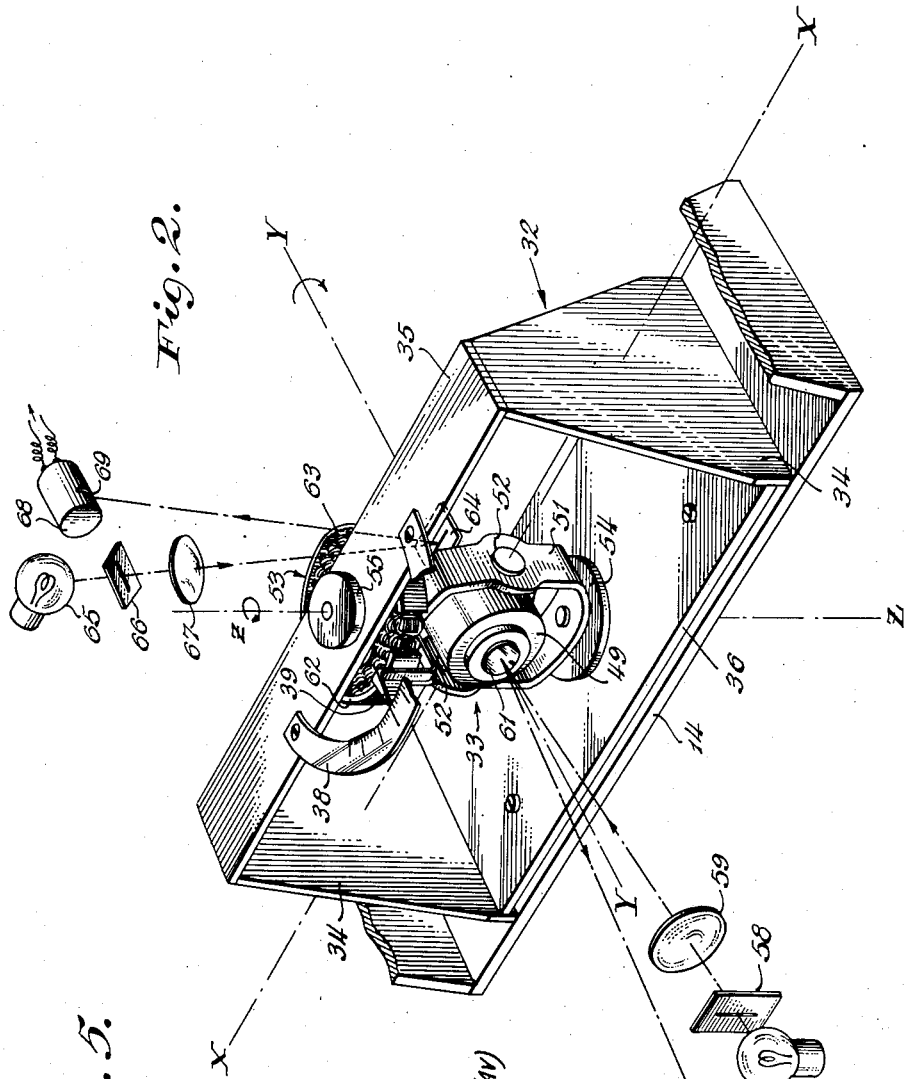
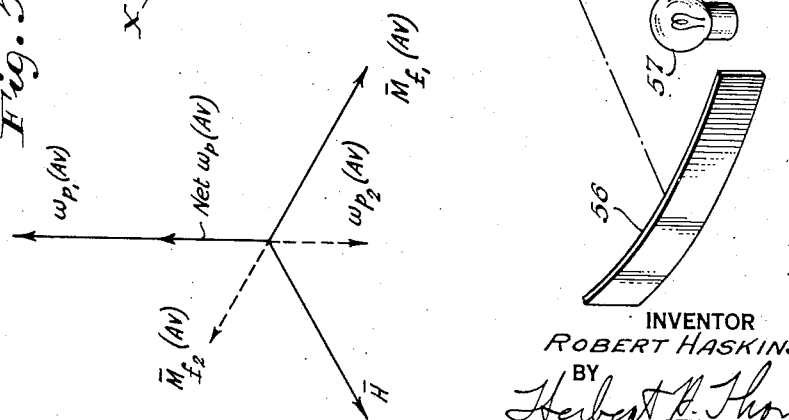
INVENTOR
ROBERT HASKINS, JR.
BY
Herbert A. Thompson
his ATTORNEY.

Patented May 24, 1949

2,470,773

UNITED STATES PATENT OFFICE 2,470,773

ASYMMETRIC SCORSBY AND METHOD OF OPERATION

Robert Haskins, Jr., Rutherfordton, N. C., assignor to The Sperry Corporation, a corporation of Delaware Application May 3, 1944, Serial No. 533,985

13 Claims. (Cl. 73—1)

My application relates to measuring and testing devices, in general, and concerns itself more particularly with apparatus for determining bearing friction, and especially that portion of the bearing friction scientifically known as dry or coulomb friction. This type of friction is that which is independent of the relative velocity of the bearing surfaces, and hence is distinguished from the friction due to the viscosity of the lubricant, which varies with such velocity. Dry friction proves particularly troublesome in sensitive instruments mounted on rocking platforms, such as gyroscopic instruments mounted on ships or airplanes, since the cumulative effect thereof as the ship rocks back and forth will vary in the two directions of roll where the angular velocity is different in the two directions. Hence, in time under such conditions, a marked disturbance of the instrument may develop.

In many instances it therefore is advantageous to measure the amount of dry friction exhibited by the bearings of certain precision instruments under the conditions to which they are subjected in actual operation. Since, in many instances, it has heretofore been impossible to measure these frictional values under operating conditions because of the structural form of the apparatus, it has been necessary to determine these values by static measurements. It is found in practice, however, that such measurements are wholly unreliable.

Accordingly, it is an object of my invention to provide a method and apparatus for measuring bearing friction under simulated operating conditions.

Another object of my invention is to provide a method and apparatus for measuring the value of dry friction exhibited by a bearing surface with relation to a shaft on which is mounted a rotatable mass, said apparatus comprising means for imparting asymmetrical movement to the bearing suspension of said rotatable mass about an axis thereof, and having means for measuring the angular deflection or drift of said rotatable mass in a plane of said bearing suspension for the purpose of determining the amount of dry friction developed in said bearing surfaces.

As another object of my invention, I wish to provide a method and apparatus for determining and evaluating the amount of dry friction exhibited in the gimbal bearings of a gyroscope under actual operating conditions.

It is a further object of my invention to provide a method and apparatus for simultaneously determining the value of dry friction exhibited by a plurality of gimbal bearing surfaces of a vertical gyro, the apparatus, itself, comprising an arrangement for imparting asymmetrical motion to said gyroscopic mass at an angle with its gimbal axes and a mechanism for measuring the average displacement of said gyroscopic mass due to friction and produced by said asymmetrical motion.

As another object of my invention I wish to provide apparatus in which a gyroscope, including its gimbal ring, may be mounted for asymmetrical motion about an axis at right angles to the spin axis of the gyro rotor and coaxial with the gimbal bearings thereof, which is provided with means for leveling said gyro rotor, and means for determining and measuring the angular drift imparted to said gyroscopic mass due to the coulomb or dry friction exhibited by the gimbal bearings to which the gyroscopic case is mounted.

Other objects and advantages of my invention will become apparent as the description proceeds.

In carrying out my invention in a preferred embodiment thereof, I provide a cradle in which a gyroscopic mass is mounted by means of suitable bearing suspensions, whose dry frictional forces it is desired to measure. Appropriate mechanism is also provided to impart asymmetrical movement to this cradle about an axis common to the bearing suspensions. This movement causes an angular displacement of the mass which is attributable to friction in the bearings, and by measuring this displacement for timed runs in which the asymmetrical movement is made in opposite directions, it is possible to determine the frictional forces of the bearings under operating conditions.

A more comprehensive understanding of my invention will be afforded from the following detailed description when considered in conjunction with the accompanying drawings in which like reference numerals have been used throughout to designate like parts, and in which:

Fig. 2 is a detailed view of a directional gyroscope mounted for test showing apparatus for measuring the precession of the gyroscope and for maintaining it in a level position;

Fig. 5 is a vector diagram relating the angular momentum, friction torque, and velocity of precession of a gyroscope.

Figure 1:
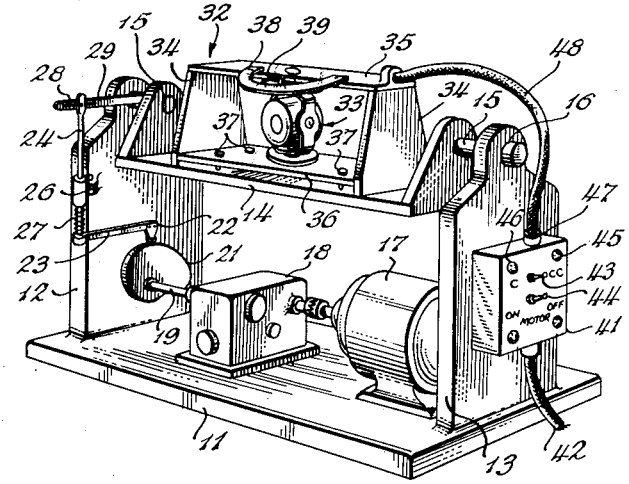
Fig. 1 is a perspective view of apparatus embodying my invention.

In the form of my invention illustrated in Fig. 1, I show apparatus which is known in the art of gyroscopic instrument testing as a scorsby. The derivation of this term is not known, but it is applied to an instrument which is capable of simulating the various motions to which a device, such as a gyro-navigational instrument, will be subjected under actual operating conditions when mounted in a ship or airplane. Prior art instruments of this description impart motion to the device under test which is symmetrical, i. e., if roll or pitch is being simulated in one direction the scorsby will provide an equally simulated condition in the opposite direction when its action is reversed. In contradistinction, the motion which I employ in the apparatus of my present invention is asymmetrical and my instrument is differentiated titulary from prior art instruments as an "asymmetrical scorsby."

The apparatus illustrated in Figure 1 shows the cradle for mounting a rotatable mass in its bearing suspensions and the mechanism for rocking it asymmetrically about an axis common to the bearings forming the suspension. A base member 11 carries two uprights 12 and 13 between which a cradle 14 is suspended for movement on the pin shafts 15 journalled in the uprights as at 16.

Power for rocking cradle 14 is supplied by a shunt wound electric motor 17 attached to base 11 and asymmetrical motion for the cradle is provided by the train through which this power is delivered. The speed of electric motor 17 is reduced by means of a reduction gear 18 on whose output shaft 19 an eccentric cam 21 is rigidly attached. Cooperating with cam 21 is a cam follower 22, which is carried on a horizontal arm 23 attached to a vertical arm 24. Arm 24 is slidably mounted in a sleeve bracket 26 forming a part of upright 12, and carries a compression spring 27 which acts against a surface of bracket 26 and arm 23 to hold follower 22 in engagement with cam 21. Arm 24 is adjustably attached through a slot and pin screw arrangement 28 to arm 29 which is fixed to the cradle 14.

A mounting bracket 32, in which an instrument, such as a directional gyroscope 33, may be mounted is so arranged that the gimbal bearings supporting the frame or case of the gyroscope is coincident with the rocking axis of cradle 14 about the pin shafts 15 when the gimbal bearings are in a null position. This bracket is made up of two end plates 34, a top plate 35, and a base plate 36. The latter is drilled to receive bolts 37 which are used to bolt the entire assembly to the cradle 14. Top plate 35 carries a graduated scale 38 which together with pointer 39 indicates the angular deflection of the gyroscope 33 about a vertical axis. All other details of mounting the gyroscope 33 will be treated subsequently in connection with Fig. 2.

Electric energy for scorsby motor 17 and gyroscope 33 is supplied to a control box 41 by a cable 42. This box is provided with switches 43 and 44 for turning motor 17 on and off and for controlling the direction of its rotation. Colored lights 45 and 46 provide visual means for indicating the direction in which the scorsby is operating. From outlet 47 electric energy is delivered to the various gyro-motors by cable 48.

As will be brought out later in connection with the theory of its operation, it is necessary to provide the scorsby with apparatus for maintaining the gyro-rotor of gyroscope 33 level and for measuring its angular deflection. While various methods may be employed for accomplishing these two functions, I have found optical systems conveniently adaptable for both, as will now be explained in connection with the mounting arrangement of the gyroscope 33, shown in Fig. 2.

Here the gyroscope 33 comprising a gyro-rotor, gyro casing, gimbal ring, etc., is mounted in the mounting bracket 32 as was explained with respect to Fig. 1. The gyro-rotor, or gyroscopic mass (not shown), is journaled for rotation within the gyro case 49 and is electrically driven to rotate clockwise at a high speed as indicated by the arrow about the YY axis, known as the spin axis. Gyro casing 49 is in turn suspended in a gimbal ring 51 by means of bearings 52, called gimbal bearings, and the same is free to move within the limits of certain stops (not shown) about the XX axis, or gimbal bearing axis, which is coincident with the axis of movement of cradle 14 (Fig. 1) about the pin shafts 15. Gimbal ring 51, in addition to the gyro rotor and casing assembly, also carries the stator 63 of a torque motor 53 and is mounted on trunnions 54 and 55 for rotation about the vertical axis ZZ.

In accordance with well-known physical laws, gyroscope 33 will exhibit certain operational characteristics when its rotor is being driven at proper speed, and it is these principles which I employ in practising my invention. For example, since the gyroscope tends to remain level when the cradle is rocked, the frictional forces exhibited by gimbal bearings 52, together with other forces, will cause the gyro rotor and casing assembly to precess with gimbal ring 51 about the vertical axis ZZ. Since the value of these frictional forces is a function of this precession, other factors remaining constant, it is only necessary to measure the amount of precession to determine the friction of the bearings.

The angular deflection or precession of the gyro-rotor about axis ZZ is measured on a graduated scale on a screen 56 in the following manner. A beam of light from source 57 is passed through screen 58 and lens 59, to a mirror 61 attached to the face of gyro casing 49. This mirror reflects the slit beam of light to screen 56 whose position is fixed. Thus, as the gyro precesses, the mirror surface reflects the light beam by an amount equal to twice the angular precession of the gyro which can be measured on a two dimensional screen 56.

It is obvious that the accuracy of this measurement is dependent, among other things, upon maintaining the gyro-rotor level. Here again, an optical system is employed which takes advantage of another operational characteristic of the gyroscope for effecting its purpose. For the same reasons that the gyro precesses about the ZZ axis it also precesses about its gimbal bearing, or XX axis, thus tending to make it unlevel. This precession may be augmented or counteracted by a torque applied to the gimbal ring of the gyroscope, and accordingly, by applying a torque in a proper direction to compensate for precession about the XX axis, the gyro may be maintained in a level position.

This torque is applied to the gimbal ring by the torque motor 53 which is of the squirrel cage type, which comprises a squirrel cage 62 and a stator 63. The squirrel cage is fixed in a stationary position to the upper bracket assembly and the stator is attached to the vertical gimbal ring and rotates with it. By controlling the current to motor 53 the direction in which the torque is to be applied may be selected and precession compensated for. Thus, if the gyro-rotor is turning in a direction indicated by the arrow and a torque is applied about the ZZ axis in a direction similarly indicated, the forward face of the gyro casing 49 will be tilted upwardly.

To effect a proper direction of torque application necessary to maintain the gyro casing 49 in a level position, a photo-electric control system is provided. In this system, a mirror 64, which is attached to casing 49, receives a slit beam of light from source 65 through screen 66 and lens 67, which is reflected from its surface to a photo-electric cell contained in shield 68. Shield 68 is provided with a slot 69 which is of such dimensions as to receive the slit beam of light reflected from mirror 64.

Figure 4:
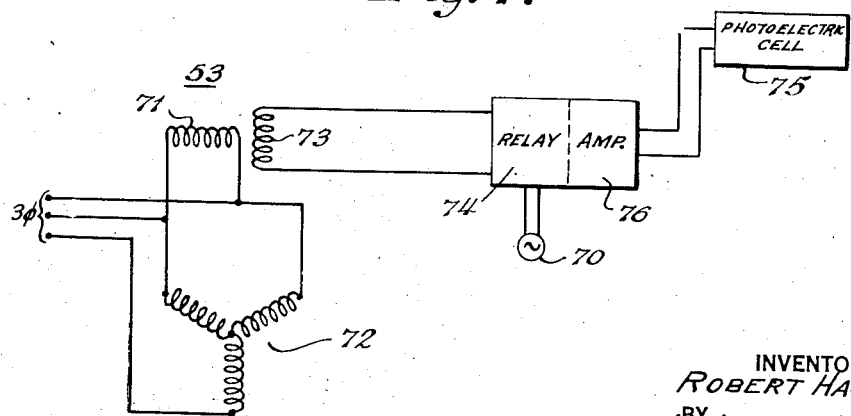
Fig. 4 is a schematic circuit diagram of the leveling device for said gyroscopic device.

With reference to Fig. 4, which is a schematic showing of a control circuit for motor 53, it will be noted that the fixed field winding 71 of torque motor 53 receives power from the three phase source which supplies the gyro-rotor 72, and that its control field winding 73 is supplied a control current from source 70 through relay 74, which in turn is controlled by photo-cell 75 acting through amplifier 76. For the level position of gyro casing 49 (Fig. 2) mirror 64 and shield 68 are adjusted so that the photoelectric cell 75 (Fig. 4) contained therein is continuously receiving light from mirror 64. Accordingly, cell 75 under the action of light from mirror 64 produces a signal which is subsequently amplified by amplifier 76 and delivered to control relay 74. This current will cause motor 53 to apply a torque to gimbal ring 51 which in turn will tilt gyro casing 49 from its level position. As the casing 49 is tilted the position of mirror 64 will be changed and the light reflected therefrom will no longer be received by cell 76. When the light circuit is broken, relay 74 operates to apply current to control field winding 73 in a reverse manner, a reverse torque is applied to gimbal ring 51, gyro casing 49 is returned to its level position, and the cycle of operation is repeated. Thus the gyro casing 49 is continuously hunting a position which maintains it substantially level.

Having described an embodiment of my invention, I will now proceed to explain its operation and the theory upon which I believe such operation to be based.

It has been mentioned previously that the frictional forces of the bearings of a gyroscope will cause it to precess in certain directions under certain conditions. Other forces such as those produced by windage and unbalance of the gyro-rotor are also present and contribute to this precession. If, therefore, the frictional forces are to be determined as a function of the precession of the gyroscope, the effects of these other forces must be neutralized. Further, any method employed must presuppose the condition that meaurements must be made under circumstances in which operational conditions of the gyroscope are simulated.

With these conditions imposed, an analysis of the forces with which we will deal will be made and their definitions given.

For the particular embodiment of my invention just described it is proposed to measure the bearing friction torque, $M_f$, of the bearings 52. This torque may be expressed as follows:

(1) $$W_p = \frac{K M_f}{H}$$

where K is a constant,

H, the angular momentum of the gyro motor equal to the product of its moment of inertia and its spin velocity, and $W_p$, the angular velocity of precession due to friction torque.

Figure 3:
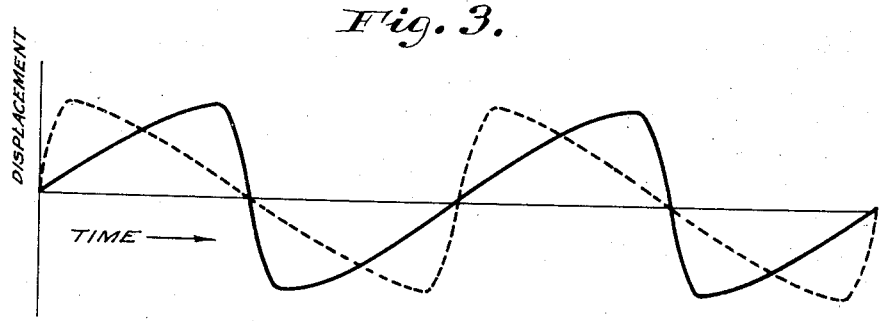
Fig. 3 is a graph, showing displacement versus time of the cradle of the apparatus shown in Fig. 1.

For the apparatus above described, it is to be remembered that the gyroscope 33 is mounted on cradle 14 so that the axis about which cradle 14 oscillates is coincident with the axis of bearings 52 when the latter are in an initial or null position and precession will be caused about the Z—Z axis when the cradle is rocked. Cradle 14 is driven in such a manner through the action of cam 21 (Fig. 1) that its oscillation while periodic, is not sinusoidal. Its displacement velocity for one direction of rotation of cam 21 is much greater than for that of its opposite rotation and the time required for cradle 14 to make one complete cycle of movement is asymmetrical with respect to direction of rotation of cam 21. Cam 21 is turned at a very slow rate, reduction gear 18 having a ratio in the order of 2500:3, and the assumption is here made that the bearing friction of the bearings under test is of the coulomb type, that is, its magnitude is independent of velocity. Thus, when bearings 52 are subjected to the slow, asymmetrical motion of cradle 14 rotation during one part of the cycle will take longer in one direction than the other, as may be seen from the displacement time diagram of Fig. 3. After a period of time there will of course be a net difference in the time of rotation in the two directions, and a net frictional torque will be evident in one direction. If the direction of motion of cradle 14 is reversed there will be a greater net time of rotation in the opposite direction and the frictional torque of the bearings will be reversed. These two average torques will precess the gyro in opposite directions, as shown by the vector diagram in Fig. 5, and the difference in the average rate of precession may be taken as a measurement of the frictional torque of the gimbal bearings 52, all other forces effecting precession, as will be shown, having cancelled themselves in the opposite timed runs of cradle 14.

Thus, for the two timed runs of the scorsby the angular velocity of precession for each may be expressed by means of Equation 1 as follows:

(2) $$W_{p1} = \frac{M_f}{H} + W_x$$

and (3) $$W_{p2} = \frac{M_f}{H} + W_x$$

where $W_x$ is the angular velocity of precession due to forces other than friction.

If $\theta_1$ and $\theta_2$ represent the angles of precession respectively for two cycles of the scorsby run in opposite directions, if $T$ represents the period of oscillation, and if the proportion of the whole period in which rotation has been at a slow rate, is represented by the symbol $\delta$, then $\theta_1$ and $\theta_2$ may be expressed in terms of Equations 2 and 3 as follows:

$$(4) \quad \theta_1 = \frac{M_f}{H}[\delta T - (1-\delta)T] + W_x T$$

$$\theta_1 = \left[\frac{M_f}{H}(2\delta - 1) + W_x\right]T$$

$$\theta_2 = \frac{-M_f}{H}[\delta T - (1-\delta)T] + W_x T,$$

or $$(5) \quad \theta_2 = \left[\frac{-M_f}{H}(2\delta - 1) + W_x\right]T$$

Subtracting $\theta_2$ from $\theta_1$, which is the net angular precession, the frictional torque, $M_f$, is expressed by the friction equation $$(6) \quad M_f = \frac{(\theta_1 - \theta_2)}{T}\frac{H}{2}\frac{1}{(2\delta - 1)}$$

From Equation 6 the absolute magnitude of the frictional torque exerted by the gimbal bearings 52 can be determined in suitable units, since $(\theta_1 - \theta_2)$ is measured and the values of the other factors are known.

Figure 6:
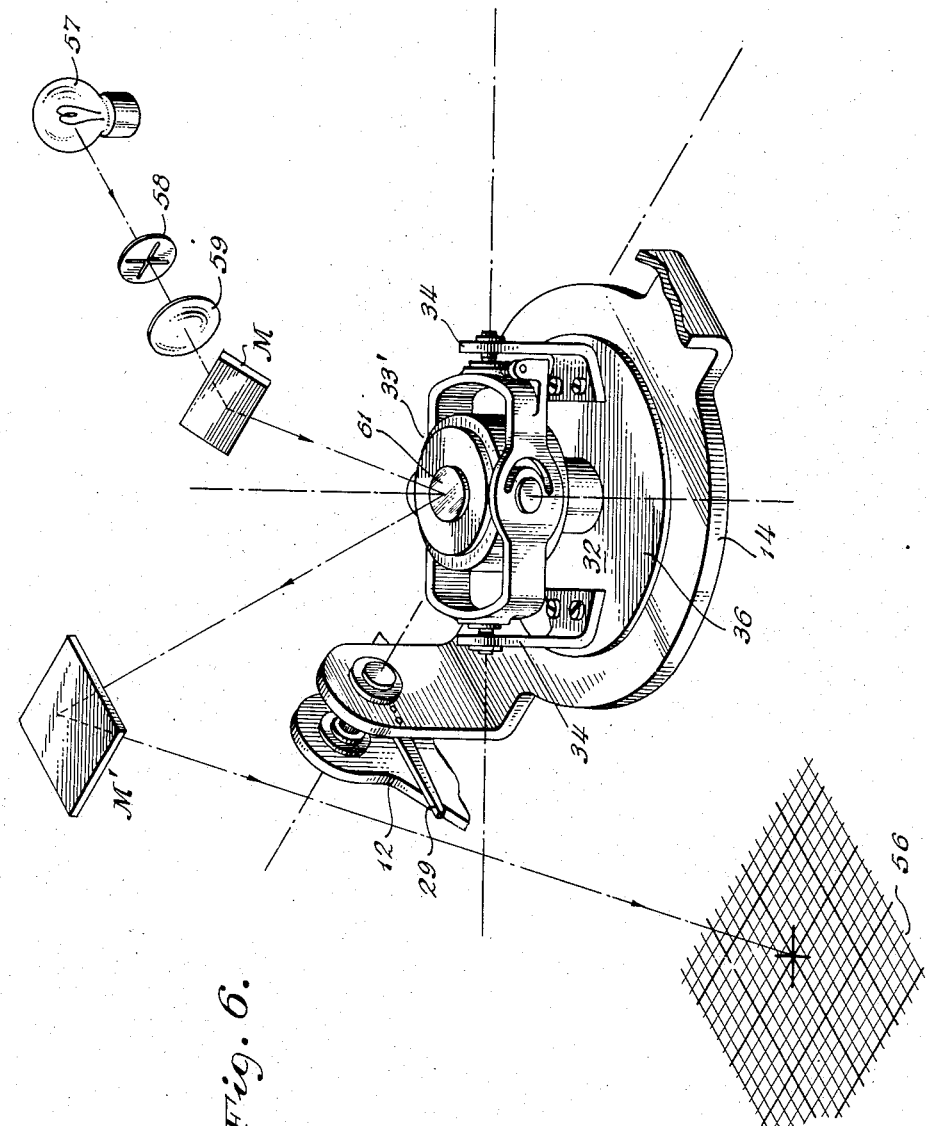
Fig. 6 is a modification of my invention adapting it to vertical gyro applications.

While I have shown and described one embodiment of my invention in connection with a directional gyroscope it is not my intention to be limited to this application nor to this single use of it. It will be obvious to those skilled in the art that the frictional torque of trunnions 54 and 55 can be measured with only a slight rearrangement of the measuring and leveling systems. Likewise the frictional forces of the various bearings in vertical gyroscopes may be similarly determined with an arrangement of the apparatus as illustrated in Fig. 6.

Here, the apparatus is arranged similarly to that illustrated in Fig. 2 with necessary modifications being made to adapt it to the particular structure of a vertical gyroscope 33'. The cradle 14 and mounting bracket 32 are shaped to permit a rotation of the gyro mounting in order that asymmetrical motion may be imparted to the gyroscope. In this form of the invention, the cradle may be moved about a third axis angularly spaced from the axes of support of the gyroscope and normally situated in the plane of the two normally horizontal, mutually perpendicular mounting axes of the gyroscope. With the exception of the additional elements comprising the mirrors M and M', which are necessary to properly deflect the light for the particular arrangement of the apparatus, the optical system is the same.

With the vertical gyroscope mounted as a free gyroscope (without erection apparatus), the difference between the rates of precession, or drift, with the scorsby operated first in one direction and then in the opposite direction, is a direct measurement of the net frictional torques produced by the asymmetrical motion and exhibited by both sets of gimbal bearings. The position of the cross hair image bears a direct relationship to the angular position of the spin axis of the gyro and accordingly the drift of the gyro can be measured as a function of the drift of the image.

By mounting the gyro on the cradle 14 in a manner such that neither of the gimbal bearing axes are parallel with the axis of movement of the cradle 14, it is possible to determine the frictional torques about both of the gimbal bearing axes and by a simple analysis of the data obtained to calculate the frictional torques of each set of gimbal bearings with but one run of the scorsby.

Further, and with slight modification, my invention is adaptable to a number of similar applications such as measuring the bearing friction of sensitive electrical instruments under operating conditions. Many of these and other uses require a special application of the basic theory herein taught, however, and accordingly it is not feasible to attempt to treat all of them here. It is intended, therefore, that all matter contained in the above description or shown in the accompanying drawings shall be interpreted as illustrative and not in a limiting sense.

What is claimed is:

1. In a rotating gyro bearing friction determining device wherein bearing friction is determined in place in the gyro, the improvements comprising means for mounting a gyro for movement about an axis in line with a bearing axis of the gyro, means for maintaining said gyro in a fixed position with respect to said bearing axis, means for imparting asymmetrical motion to said mounting means about said bearing axis, and means for measuring the displacement of said gyro due to said asymmetrical motion as a measurement of bearing friction.

2. A method for determining the gimbal bearing friction of a gyroscope comprising the steps of mounting said gyroscope for movement about its gimbal bearing axis, imparting asymmetrical motion to said gyroscope mounting, measuring the precession of said gyroscope, and determining bearing friction as a function of precessive displacement.

3. In a friction measuring device for gyroscopes, a cradle mounting a gyroscope for movement about its trunnion and gimbal bearing axes, means for imparting asymmetrical motion to said cradle about an axis coincident with said gimbal bearing axis when the latter is in null position, and means for measuring the angular precession of said gyroscope about its trunnion axis.

4. An asymmetrical scorsby, comprising a cradle for mounting a movable mass having its parts in bearing suspension, means for moving said cradle asymmetrically about an axis common initially to the bearings of said bearing suspension, means for maintaining said mass positioned in a fixed horizontal plane during movement of the cradle about said common axis, and means for measuring the displacement of said mass about a second axis for determining the friction of said bearings.

5. In a scorsby device for gyroscopes, cradle means for mounting a gyroscope for movement about its gimbal bearing axis, means for imparting asymmetrical movement to said cradle about an axis in a plane including the gimbal bearing axis, and means for measuring the precession of said gyroscope about a second axis due to gimbal bearing friction.

6. Apparatus for measuring gimbal bearing friction in a gimbal frame supporting a gyroscope for precession about two intersecting normally horizontal, mutually perpendicular axes which comprises a cradle to which the gimbal frame may be detachably secured for testing purposes, means supporting the cradle for rocking movement about a third horizontal axis normally in the plane of the axes of the gimbal frame;

means for imparting an asymmetrical motion to the cradle to cause precession of the gyroscope about at least one of its axes, and means controlled by the gyroscope in accordance with the precessional displacement thereof for indicating the magnitude of gimbal bearing friction.

7. Apparatus for measuring gimbal bearing friction in a gimbal frame supporting a gyroscope for precession about two intersecting, normally horizontal, mutually perpendicular axes which comprises a cradle to which the gimbal frame may be attached for testing purposes, means for rocking the cradle about a third horizontal axis in the plane of the axes of the gimbal frame back and forth at a greater rate in one direction than the other causing the gyroscope to precess about at least one axis by different amounts in opposite directions resulting in a cumulative precession displacement in one direction, and means controlled by the gyroscope according to the precessional displacement thereof for indicating gimbal bearing friction.

8. Apparatus for measuring gimbal bearing friction in a gimbal frame supporting a gyroscope for precession about two intersecting axes, which includes a support to which the gimbal frame may be secured, means for imparting an asymmetrical rocking motion to the support back and forth in such direction as to cause corresponding rocking movement of the gimbal frame with respect to the gyroscope about the axis of one of the gimbal bearings whereby any friction in the latter bearings will cause a precessional movement of the gyroscope about another axis of the gimbal frame, and means actuated by the gyroscope according to the precessional displacement thereof for indicating the magnitude of the bearing friction.

9. Apparatus for measuring gimbal bearing friction in a gimbal frame supporting a directional gyroscope for movement about two intersecting axes which comprises a cradle to which the gimbal frame may be secured, means for supporting the cradle for rocking movement about an axis, means comprising a torque motor effective on the vertical axis of the gyroscope for levelling the spin axis thereof, means for imparting an asymmetrical motion to the cradle about the axis thereof thus producing relative movement of the gimbal frame and gyroscope about the horizontal gimbal axis whereby friction in the gimbal bearings disposed along the latter axis causes a progressive precessional displacement of the gyroscope about the vertical gimbal axis, and means controlled by the gyroscope for indicating bearing friction in accordance with the precessional displacement thereof.

10. Apparatus for measuring gimbal bearing friction in a gimbal frame supporting a directional gyroscope for movement about two intersecting axes which comprises a cradle to which the gimbal frame may be secured, means for supporting the cradle for rocking movement about a horizontal axis, means comprising a torque motor coupled with the vertical axis of the gimbal frame for levelling the spin axis of the gyroscope, means for imparting an asymmetrical motion to the cradle about the axis thereof thus producing relative movement of the gimbal frame and gyroscope about the horizontal gimbal axis whereby friction in the gimbal bearings disposed along the latter axis causes a progressive precessional displacement of the gyroscope about the vertical gimbal axis, and means controlled by the gyroscope in accordance with the precessional displacement thereof for indicating bearing friction.

11. Apparatus for measuring gimbal bearing friction in a gimbal frame supporting a directional gyroscope for movement about two intersecting axes, which comprises a cradle to which the gimbal frame may be secured with one of the axes thereof in horizontal position, means for supporting the cradle for rocking movement about a horizontal axis, means comprising a torque motor coupled with the vertical axis of the gimbal frame for maintaining the spin axis of the gyroscope in a level position, means for imparting an asymmetrical motion to the cradle about the axis thereof thus producing relative movement of the gimbal frame and gyroscope about the horizontal gimbal axis whereby friction in the gimbal bearings disposed along the latter axis causes progressive precessional displacement of the gyroscope about the vertical gimbal axis, and means controlled by the gyroscope in accordance with the precessional displacement thereof for indicating bearing friction.

12. Apparatus for measuring gimbal bearing friction in a gimbal frame supporting a gyroscope which comprises a cradle rotatable about a horizontal axis in which the gimbal frame under test is secured with the spin axis of the gyroscope angularly disposed with respect to the axis of the cradle whereby rocking of the cradle about its axis will cause displacement of the gimbal frame with respect to the gyroscope about at least one of its axes and the resulting bearing friction will cause precession of the gyroscope about an opposite gimbal axis, means for imparting an asymmetrical movement to the cradle about its axis to thereby precess the gyroscope progressively and means controlled by the gyroscope in accordance with the precessional displacement thereof for indicating gimbal bearing friction.

13. In a scorsby device for gyroscopes, cradle means for mounting a gyro vertical for movement about two, normally horizontal, mutually perpendicular axes, means for imparting asymmetrical movement to said cradle about a third axis angularly spaced from the horizontal axes of the gyro vertical and normally situated in the plane of the axes of the gyro vertical, and means for measuring the precession of the gyro vertical about its two mounting axes due to bearing friction.

ROBERT HASKINS, Jr.

REFERENCES CITED

The following references are of record in the file of this patent:

UNITED STATES PATENTS

| Number | Name | Date |
|---|---|---|
| 1,310,862 | Gray | July 22, 1919 |
| 1,362,700 | Huffman | Dec. 21, 1920 |
| 1,370,359 | Phillou | Mar. 1, 1921 |
| 1,560,435 | Sperry | Nov. 3, 1925 |
| 2,091,022 | Stuart | Aug. 24, 1937 |

FOREIGN PATENTS

| Number | Country | Date |
|---|---|---|
| 526,279 | Great Britain | Sept. 13, 1940 |

OTHER REFERENCES

Technical Notes No. 662, National Advisory Committee for Aeronautics, "Gyroscopic Instruments for Instrument Flying," by Brombacher and Trent, 1938, pgs. 11, 12, 14, 15, 19.